United States Patent
Suzuki et al.

(10) Patent No.: US 9,731,573 B2
(45) Date of Patent: Aug. 15, 2017

(54) SUSPENSION ARM (71) Applicant: TOYOTA JIDOSHA KABUSHIKI KAISHA, Toyota-shi, Aichi-ken (JP)

(72) Inventors: Tokukatsu Suzuki, Toyota (JP); Daisuke Fukumori, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/088,722

(22) Filed: Apr. 1, 2016

(65) Prior Publication Data
US 2016/0347138 A1 Dec. 1, 2016

(30) Foreign Application Priority Data
May 27, 2015 (JP) ................. 2015-107382

(51) Int. Cl.
*B60G 7/02* (2006.01)
*B60G 7/00* (2006.01)

(52) U.S. Cl.
CPC .............. *B60G 7/02* (2013.01); *B60G 7/001* (2013.01); *B60G 7/008* (2013.01); *B60G 2202/12* (2013.01); *B60G 2204/143* (2013.01); *B60G 2204/148* (2013.01); *B60G 2206/10* (2013.01); *B60G 2206/123* (2013.01)

(58) Field of Classification Search
CPC ...... B60G 7/02; B60G 7/001; B60G 2202/12; B60G 2204/143
See application file for complete search history.

(56) References Cited

U.S. PATENT DOCUMENTS

| | | | | |
|---|---|---|---|---|
| 5,516,129 A | * | 5/1996 | Kurosu | B60G 7/001 280/124.134 |
| 5,992,867 A | * | 11/1999 | Kato | B60G 3/06 280/124.134 |
| 7,575,244 B2 | * | 8/2009 | Howell | B60G 7/001 280/124.134 |
| 8,025,301 B2 | * | 9/2011 | Guttilla | B23P 15/00 280/124.134 |
| 9,168,801 B2 | * | 10/2015 | Dicke | B60G 7/001 |
| 9,186,943 B2 | * | 11/2015 | Hosoi | B60G 7/001 |
| 2011/0079979 A1 | * | 4/2011 | Koumura | B60G 7/001 280/124.1 |
| 2011/0272911 A1 | * | 11/2011 | Gerhards | B60G 7/001 280/124.134 |
| 2016/0318362 A1 | * | 11/2016 | Watanabe | B60G 3/04 |

FOREIGN PATENT DOCUMENTS

| | | |
|---|---|---|
| JP | H06-71217 U | 10/1994 |
| JP | H07-4112 U | 1/1995 |
| JP | H08-332820 A | 12/1996 |
| JP | H09-123722 A | 5/1997 |
| JP | 2000-335216 A | 12/2000 |

* cited by examiner

Primary Examiner — Drew J Brown
(74) Attorney, Agent, or Firm — Oliff PLC (57) ABSTRACT A suspension arm has an elongated shape. The suspension arm is shaped such that a line defining an outer shape of the suspension arm does not coincide with a line of force transmission, but a line extending through a shearing center point of each of a plurality of cross sections of the suspension arm coincides with the line of force transmission.

9 Claims, 5 Drawing Sheets

$$e = \frac{3b(b_1 - b_2)}{(6b + h)}$$

$$y_G = \frac{b}{2} - \frac{h(b - 2b_1)}{2(2b + h)}$$

SUSPENSION ARM

CROSS REFERENCE TO RELATED APPLICATION

The present application claims priority from Japanese Patent Application No. 2015-107382, which was filed on May 27, 2015, the disclosure of which is herein incorporated by reference in its entirety.

BACKGROUND

Technical Field

The following disclosure relates to a suspension arm of a suspension provided between a wheel-side component and a vehicle-body-side component of a vehicle.

Description of the Related Art

Patent Document 1 (Japanese Unexamined Utility Model Application Publication No. 6-071217) discloses an upper arm extending horizontally. This upper arm is formed of an H beam and shaped such that a position of a horizontal web is located near a point of force input. This construction results in a reduced weight and an increased fatigue strength. Patent Document 2 (Japanese Unexamined Utility Model Application Publication No. 7-004112) discloses a suspension arm formed of an I beam and configured such that a width of an upper flange is greater than that of a lower flange. This construction results in a reduced weight and an increased fatigue strength. Patent Document 3 (Japanese Patent Application Publication No. 2000-335216) discloses a suspension arm formed of an I beam and including a vertical web provided with ribs, bosses, and other components. This construction can increase stiffness.

SUMMARY

Accordingly, an aspect of the disclosure relates to improvement of a suspension arm, for example, to suppression of torsional deformation.

In one aspect of the disclosure, a suspension arm is shaped such that a line defining an outer shape of the suspension arm does not coincide with a line of force transmission, and a shearing center point of each of a plurality of cross sections of the suspension arm is located near a point of force action. This construction can suppress torsional deformation.

CLAIMABLE INVENTIONS

There will be described inventions recognized to be claimable in the present invention and features of the invention.

(1) A suspension arm having an elongated shape,
wherein the suspension arm is shaped such that a line defining an outer shape of the suspension arm does not coincide with a line of force transmission, but a line extending through a shearing center point of each of a plurality of cross sections of the suspension arm coincides with the line of force transmission.

The line of force transmission is a straight line that connects points of input of an external force acting on the suspension arm. In other words, the line of force transmission is a straight line containing a point of input from a wheel-side component and a point of input from a vehicle-body-side component. For example, the line of force transmission may be a straight line containing (i) a center point of a mount portion of the suspension arm which is to be mounted on the wheel-side component and (ii) a center point of a mount portion of the suspension arm which is to be mounted on the vehicle-body-side component. A point of force action on each of the cross sections of the suspension arm is located on the line of force transmission.

The line defining the outer shape of the suspension arm may be a line extending along an outer edge of the suspension arm and may be a line extending through a center point of the suspension arm in a widthwise direction, for example. In the case where the line defining the outer shape of the suspension arm does not coincide with the line of force transmission (a straight line), the line defining the outer shape of the suspension arm is bent or curved in most cases.

The wording "coincide" means "substantially coincide" and is not limited to "completely coincide". The wording "substantially coincide" means a state in which the line extending through the shearing center point is located in a first set area determined by the line of force transmission or a state in which the greatest value or an average value of distances between the line extending through the shearing center point and the line of force transmission is less than or equal to a first set value. Each of the first set area and the first set value is may be determined based on manufacturing variation or manufacturing error, for example.

The wording "not coincide" means "not substantially coincide" and means a state in which the line defining the outer shape is located outside a second set area determined by the line of force transmission or a state in which the greatest value or an average value of distances between the line defining the outer shape and the line of force transmission is greater than a second set value. The second set area and the second set value may be equal to or greater than the first set area and the first set value, respectively, for example.

Alignment of the shearing center point and the point of force action with each other makes it difficult to generate torsion due to this force. Accordingly, in the case where the line extending through the shearing center point of each of the plurality of cross sections substantially coincides with the line of force transmission, torsion of the suspension arm can be well suppressed.

The cross-sectional shape of the suspension arm according to this form is not limited. For example, the cross-sectional shape may be any of an I-shape, an H-shape, a T-shape, an L-shape, a crank shape, a groove shape, a C-shape, and a Γ-shape, for example.

The cross section is a cross section extending in a direction intersecting the longitudinal direction of the suspension arm, and this cross section may be referred to as "transverse cross section". The plurality of cross sections may be predetermined cross sections and may be any cross sections, for example.

(2) A suspension arm, comprising:
a pair of flanges each extending in a longitudinal direction of the suspension arm; and
a connector connecting the pair of flanges to each other,
wherein the suspension arm is bent with respect to the longitudinal direction, and
wherein the connector is offset, with respect to a center point of the pair of flanges in a widthwise direction, to one of opposite sides of the center point, which one is nearer to a point of force action than another of the opposite sides.

The shape in which the suspension arm is bent with respect to the longitudinal direction is a shape in which the suspension arm does not extend in a straight line in the longitudinal direction. Examples of this shape include a shape in which the straight line is bent sharply and a shape in which the straight line is curved. Specifically, this shape includes a crank shape, an S-shape, and a curved shape, for example.

The longitudinal direction is determined by a portion of the suspension arm which is mounted on the wheel-side component and a portion of the suspension arm which is mounted on the vehicle-body-side component. A shape of the suspension arm in the longitudinal direction is a shape between the portion mounted on the wheel-side component and the portion mounted on the vehicle-body-side component. For example, the upper arm curved in a U-shape in Patent Document 1 has a shape in which the upper arm extends in a straight line.

In the case where the suspension arm is shaped so as to be bent with respect to the longitudinal direction, the line of force transmission extends off the suspension arm in some case. In the case where the connector is offset to the side nearer to the point of force action, in contrast, the shearing center point can be set at a position located off the suspension arm and thereby be positioned nearer to the point of force action. Also, in the case where the connector is offset to the side nearer to the point of force action, a centroid of the cross section can be located nearer to the point of force action. As a result, even in the case where the suspension arm is bent with respect to the longitudinal direction, it is possible to reduce lowering of a buckling strength.

(3) The suspension arm according to the above form (2), wherein the connector is provided in a state in which a line extending through a shearing center point of each of a plurality of cross sections of the suspension arm coincides with a line extending through a point of force action.

(4) A suspension arm having a shape in which the suspension arm is bent with respect to a longitudinal direction thereof,
wherein the suspension arm is shaped such that a line extending through a shearing center point of each of a plurality of cross sections of the suspension arm extends in a straight line.

Even in the case where the suspension arm is bent with respect to the longitudinal direction, the shearing center point on each of any cross sections can be located substantially on the straight line by devising the cross-sectional shape of the suspension arm.

(5) A suspension arm having a shape in which the suspension arm is bent with respect to a longitudinal direction thereof,
wherein the suspension arm is shaped such that a distance between (i) a line extending through centroids on a plurality of cross sections of the suspension arm and (ii) a line extending through a point of force action is less than a distance between (a) a line extending through a center point of the suspension arm in a widthwise direction thereof and (b) the line extending through the point of force action.

For example, when comparing the case where the connector is provided on a center point of a pair of flanges and the case where the connector is provided so as to be offset to one of opposite sides of the center point, which one is nearer to the point of force action, the centroid can be located nearer to the point of force action in the latter case than in the former case.

(6) The suspension arm according to any one of the above forms (1) through (5), further comprising:
an arm body;
a mount portion to be mounted on a vehicle-body-side component and provided on one end portion of the suspension arm in the longitudinal direction; and
a mount portion to be mounted on a wheel-side component and provided on another end portion of the suspension arm in the longitudinal direction.

The technical feature according to any one of the above forms (1) through (5) can be employed for the arm body.

It is noted that two or more of the technical features according to any one of the above forms (1) through (6) can be employed for the suspension arm in combination.

BRIEF DESCRIPTION OF THE DRAWINGS

The objects, features, advantages, and technical and industrial significance of the present disclosure will be better understood by reading the following detailed description of the embodiment, when considered in connection with the accompanying drawings, in which.

DETAILED DESCRIPTION OF THE EMBODIMENT

Hereinafter, there will be described a suspension arm according to one embodiment by reference to the drawings. It is to be understood that the following embodiment are described only by way of example, and the disclosure may be otherwise embodied with various modifications without departing from the scope and spirit of the disclosure.

Figure 1:
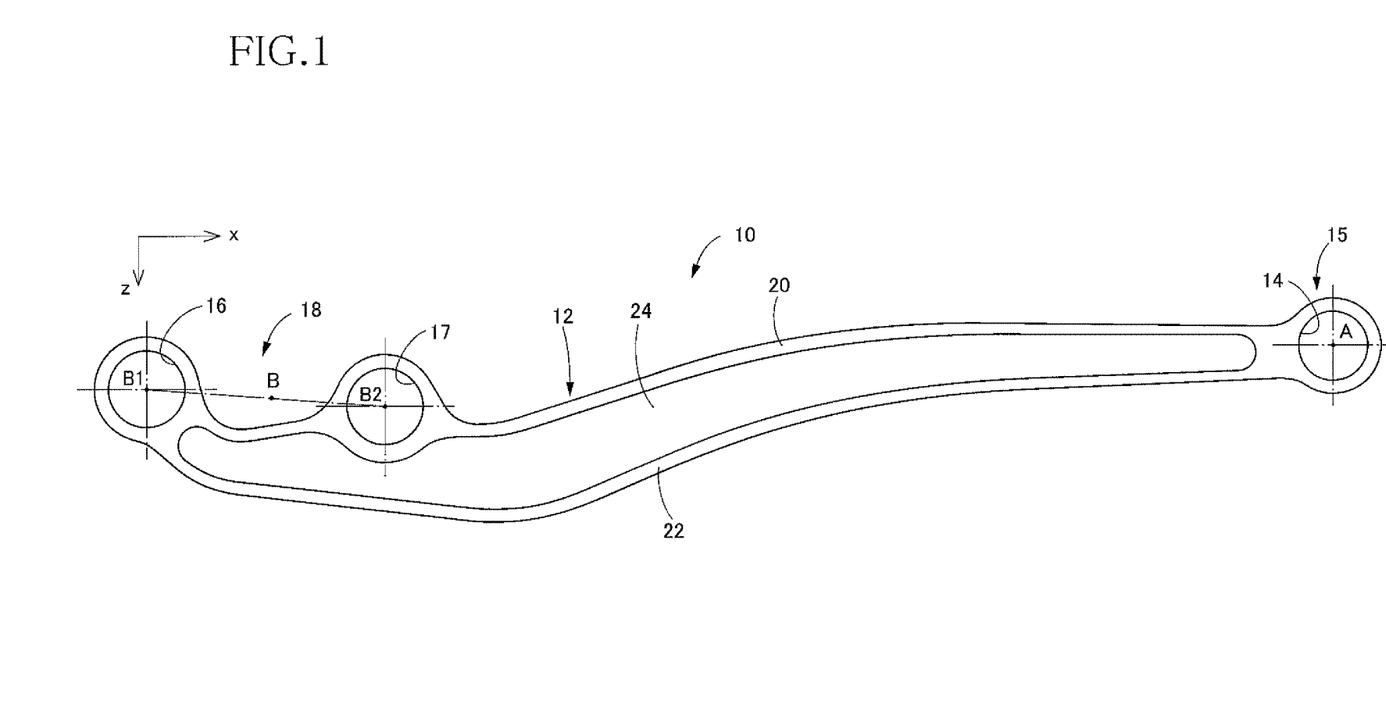
FIG. 1 is a front elevational view of a suspension arm according to one embodiment.
Figure 2A:
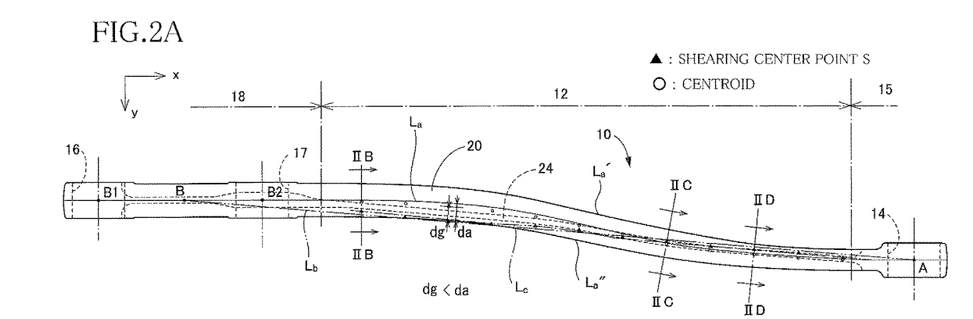
FIG. 2A is a plan view of the suspension arm.
Figure 2B:
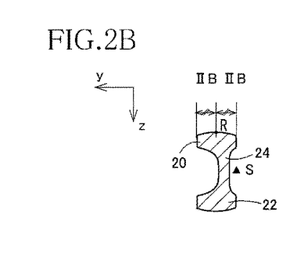
FIG. 2B is a cross-sectional view taken along line IIB-IIB in FIG. 2A.
Figure 2C:
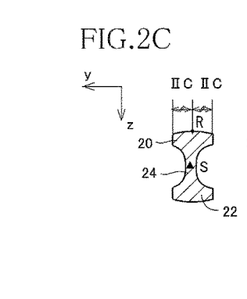
FIG. 2C is a cross-sectional view taken along line IIC-IIC in FIG. 2A.
Figure 2D:
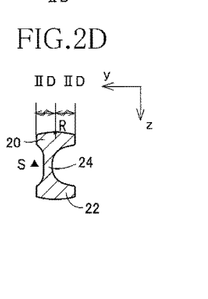
FIG. 2D is a cross-sectional view taken along line IID-IID in FIG. 2A.

As illustrated in FIGS. 1 and 2A, a suspension arm 10 according to the present embodiment is elongated in its longitudinal direction and includes: an arm body 12, a mount portion 15 provided at one end portion of the arm body 12, and a mount portion 18 provided at the other end portion of the arm body 12. The mount portion 15 has a through hole 14, and the mount portion 18 has two through holes 16, 17. As illustrated in FIGS. 2B-2D, the arm body 12 has an I-shape in cross section and includes: a pair of flanges 20, 22 each extending in the longitudinal direction; and a connector 24 connecting the pair of flanges 20, 22 to each other. This connector 24 may be referred to as "vertical web".

In FIGS. 1-2D, the longitudinal direction of the suspension arm 10 is defined as an x direction. The height direction of the suspension arm 10 (i.e., a direction in which the connector 24 extends) is defined as a z direction. A direction perpendicular to the x direction and the z direction is defined as a y direction.

The suspension arm 10 does not extend in a straight line in the longitudinal direction but is curved in a crank shape in the present embodiment. It is apparent that a line defining an outer shape of the suspension arm 10, e.g., a line La connecting center points (points R in FIGS. 2B-2D) of the flange 20 or the flange 22 in its widthwise direction) does not extend in a straight line on the xy plane but is curved in a crank shape. It is noted that the line La may be hereinafter referred to as "the line defining the outer shape". It is also apparent that the line La defining the outer shape does not coincide with a line Lb of force transmission which will be described below. It is noted that the line defining the outer shape may be replaced with lines La', La" extending along an outer edge of the suspension arm 10.

The arm body 12 has a shape in which a position on the connector 24 relative to the pair of flanges 20, 22 in a widthwise direction of the suspension arm 10 (i.e., a connecting position) changes with a position on the connector 24 in the longitudinal direction. As illustrated in FIGS. 2B-2D, a shearing center point S changes in the y direction with change in the connecting position on the connector 24. In the present embodiment, the position on the connector 24 relative to the pair of flanges 20, 22 on each cross section is designed such that the shearing center point S is aligned with a point. P of force action (i.e., a point of action of force). It is noted that each cross section is a plane perpendicular to the line La defining the outer shape.

Figure 3:
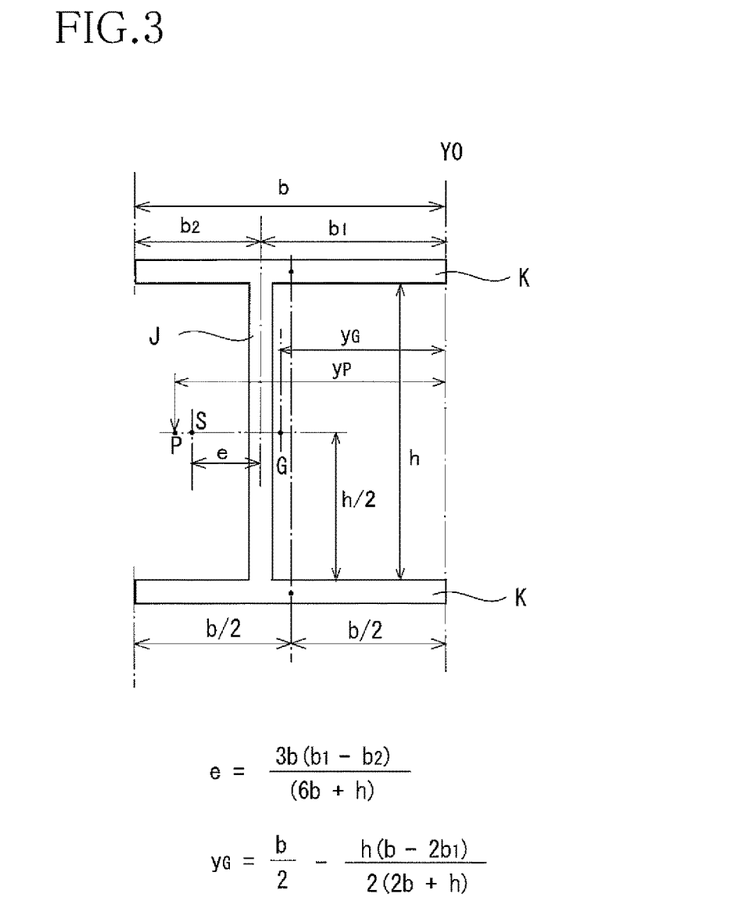
FIG. 3 is a view for explaining a shearing center point and a centroid of each of a plurality of cross sections of the suspension arm.

The shearing center point S on each cross section is determined based on the shape of the cross section. In the case where, in an I-shape cross section of a pair of flanges K and a connector J, as illustrated in FIG. 3, the width of each flange K is defined as "b", the length of the connector J is defined as "h", and the connector J is located at a distance of the length b1 from one end of the flange K (i.e., Y0 in FIG. 3), a distance e between the shearing center point S and the connector J is expressed by the following equation:

$$e = 3b(b_1 - b_2)/(6b + h)$$

Since the sum of the lengths $b_1$, $b_2$ is equal to the length b of the flange K ($b_1 + b_2 = b$), the equation can be also expressed by the following equation:

$$e = 3b(2b_1 - b)/(6b + h)$$

The point P of force action on each cross section is located on the line Lb of force transmission in the suspension arm 10. In the present embodiment, the line Lb of force transmission is a line that connects points of force input in the suspension arm 10. The suspension arm 10 is mounted on a vehicle-body-side component at the mount portion 15 and mounted on a wheel-side component at the mount portion 18. Thus, as illustrated in FIG. 2A, each of a center point A of the through hole 14 and a center point B located between center points B1, B2 of the respective through holes 16, 17 corresponds to the point of force input. A straight line connecting these input points (i.e., the center points A, B) corresponds to the line Lb of force transmission.

Determination of the line Lb of force transmission determines a position of a point P of action (e.g., a length yP from the one end Y0) on each cross section. Thus, the length b1 can be determined such that the shearing center point S is aligned with the point P of force action ($y_P = e + b_1$) on each cross section of the suspension arm 10. As a result, the position of the connector J with respect to the pair of flanges K can be determined.

The cross-sectional shape illustrated in FIG. 3 differs from the cross-sectional shape of the actual suspension arm 10. Thus, the position of the shearing center point S of the actual suspension arm 10 is not always determined by the above-described equations. In the actual suspension arm 10, however, the position of the connector 24 with respect to the pair of flanges 20, 22 can be determined in the same manner such that the shearing center point S and the point P of force action are aligned with each other on each of the plurality of cross sections.

Each of the black triangles in FIGS. 2A-2D indicates the shearing center point S on each cross section of the actual suspension arm 10 according to the present embodiment. As apparent from FIG. 2A, a line Lc extending through the shearing center point S on each cross section substantially coincides with the line Lb of force transmission.

In the I-shape cross section illustrated in FIG. 3, a distance yG between a centroid G and the one end Y0 is expressed by the following equation:

$$y_G = (b/2) - \{h(b - 2b_1)/2(2b + h)\}$$

As apparent from this equation, when the length b1 is greater than the length b/2, the distance yG is greater than the length b/2, and when the length b1 is less than the length b/2, the distance yG is less than the length b/2. In other words, in the case where the connector 24 is offset to one side with respect to the center point R of the flanges 20, 22, the centroid G is also offset to the same side.

Each of the white circles in FIG. 2A indicates the centroid G on each cross sections of the actual suspension arm 10 according to the present embodiment. As apparent from FIG. 2A, a distance dg between the centroid G and the point of force action (i.e., the point on the line Lb of force transmission) is less than a distance da between the center point R (i.e., the point on the line La defining the outer shape) in the widthwise direction of the suspension arm 10 and the point of force action (dg<da).

The position of the connector 24 of the suspension arm with respect to the flanges 20, 22 is designed as described above. Since the suspension arm 10 according to the present embodiment is curved in the crank shape with respect to the longitudinal direction, the line Lb of force transmission and the line La defining the outer shape (which extends through the center point R in the widthwise direction) intersect each other, and the line Le extending through the shearing center point S and the line La defining the outer shape intersect each other. Thus, the connector 24 is offset, with respect to the line La defining the outer shape, to one or the other side in the widthwise direction. The shearing center point S is also located on one or the other side of the line La defining the outer shape.

As illustrated in FIG. 4, the suspension arm 10 according to the present embodiment may be used as a leading arm of a rigid suspension, for example. The suspension arm 10 is provided between an axle housing 52 as a wheel-side component and a frame 54 as a vehicle-body-side component. The axle housing 52 is rotatable relative to and movable integrally with a wheel 50. The suspension arm 10 is provided in a state in which its longitudinal direction generally coincides with a front and rear direction of a vehicle, its widthwise direction with a widthwise direction of the vehicle, and its height direction with an up and down direction of the vehicle.

Figure 4A:
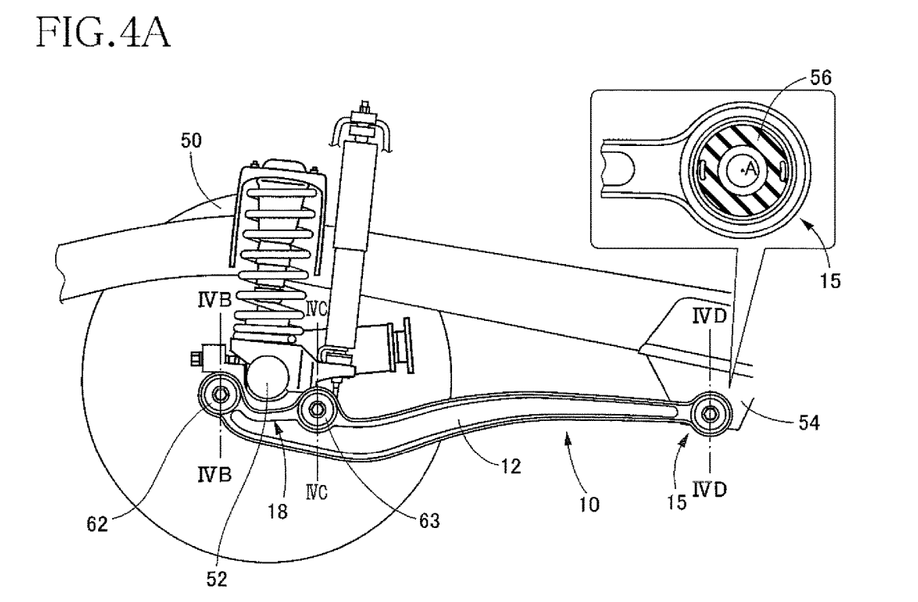
FIG. 4A is a view illustrating one example of a state in which the suspension arm is mounted on a vehicle.
Figure 4B:
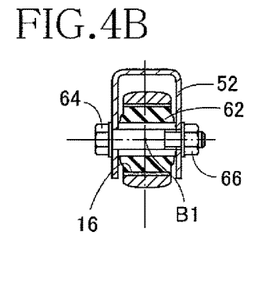
FIG. 4B is a cross-sectional view taken along line IVB-IVB in FIG. 4A.
Figure 4C:
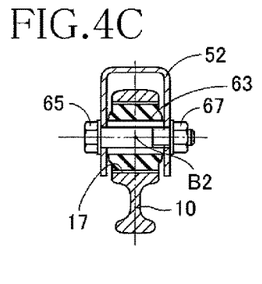
FIG. 4C is a cross-sectional view taken along line IVC-IVC in FIG. 4A.
Figure 4D:
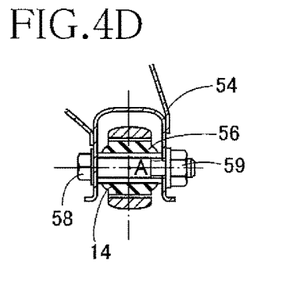
FIG. 4D is a cross-sectional view taken along line IVD-IVD in FIG. 4A.

One end portion of the suspension arm 10 is mounted at the mount portion 15 on the frame 54 by a bolt 58 and a nut 59 via a rubber bushing 56 fitted in the through hole 14, such that the suspension arm 10 is pivotable about an axis extending substantially in the widthwise direction of the vehicle. As illustrated in FIG. 4D, the center point A of the mount portion 15 is located on the central axis of the bolt 58.

Likewise, the other end portion of the suspension arm 10 is mounted at the mount portion 18 on the axle housing 52 by bolts 64, 65 and respective nuts 66, 67 via rubber bushings 62, 63 fitted in the respective through holes 16, 17, such that the suspension arm 10 is pivotable about an axis extending substantially in the widthwise direction. The center point B of the mount portion 18 is located at a center point between the center points B1, B2 (illustrated in FIGS. 4B and 4C) located on the central axes of the respective bolts 64, 65.

Figure 5A:
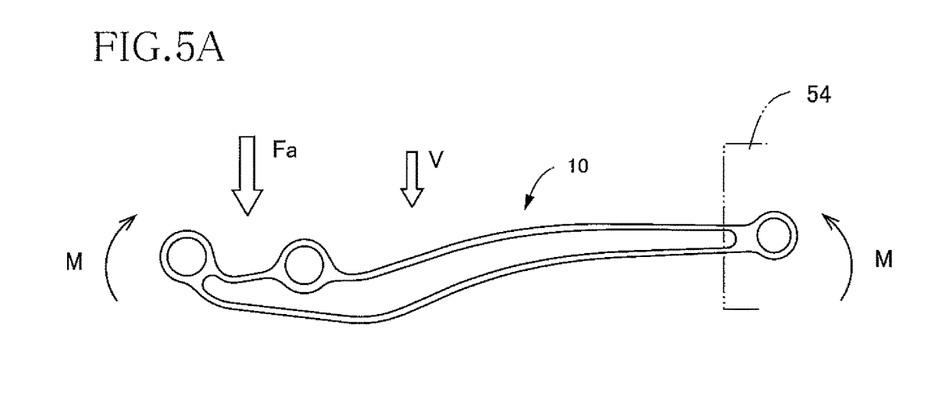
FIG. 5A is a view illustrating an up/down directional force, a moment, and a shearing force acting on the suspension arm.

For example, in the case where an external force in the up and down direction is applied to the wheel 50 due to, e.g., road input, as illustrated in FIG. 5A, a force Fa in the up and down direction is applied to the suspension arm 10, whereby a bending moment M is generated, and a shearing force V is applied to the suspension arm 10. In the suspension arm 10 according to the present embodiment, the line Lc extending through the shearing center point S in each cross section substantially coincides with the line Lb of force transmission. Accordingly, the shearing force V makes it difficult to cause torsion, so that torsional deformation is suppressed even though bending is allowed.

Figure 5B:
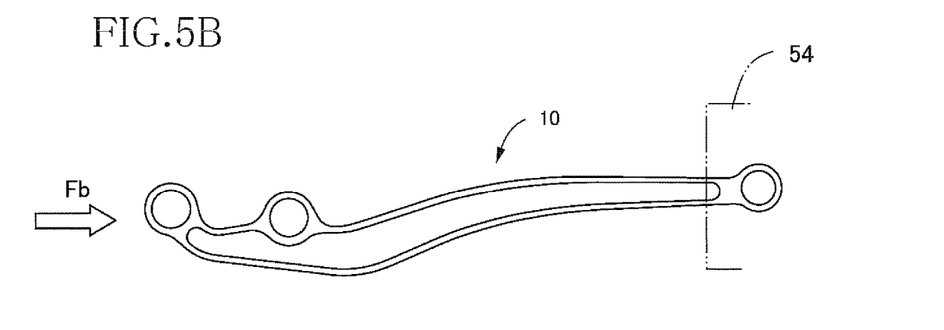
FIG. 5B is a view illustrating a compressive force acting on the suspension arm.

In some case, as illustrated in FIG. 5B, a force is applied to the wheel 50 in the front and rear direction, which applies a compressive force Fb to the suspension arm 10 in the longitudinal direction. In the suspension arm 10 according to the present embodiment, the centroid G is offset to one of opposite sides which is nearer to the line Lb of force transmission. Accordingly, it is possible to reduce a bending moment due to a compressive force and increase a buckling strength when compared with the case where the connector 24 is provided on the center point of the flanges 20, 22.

In some case, limitations on, e.g., a space for mounting of the suspension arm and a mounting position (or orientation) of the suspension arm require the suspension arm to be bent with respect to the longitudinal direction and inhibit increase in size of the suspension arm in the widthwise direction. In the case where the suspension arm is bent with respect to the longitudinal direction, a flexural strength and the buckling strength may lower. In this case, the lowering of the flexural strength and the buckling strength is prevented by, e.g., increasing the thickness of the suspension arm in most cases. This increase in thickness, however, causes another problem of increase in weight of the suspension arm. In contrast, the present suspension arm 10 has the cross-sectional shape designed such that the shearing center point S is located on the line Lb of force transmission on each cross section without increase in size of the suspension arm 10 in the widthwise direction. This construction makes it possible to suppress the torsional deformation and reduce the lowering of the buckling strength without increase in weight of the suspension arm 10 and size thereof in the widthwise direction. Also, since the suspension arm 10 is bent with respect to the longitudinal direction, the point of force action may be located off the outer edge of the suspension arm 10. Even in this case, however, the design of the cross-sectional shape of the suspension arm 10 can bring the shearing center point S closer to the line Lb of force transmission outside the outer edge of the suspension arm 10, thereby suppressing the torsional deformation without increase in size of the suspension arm 10 in the widthwise direction.

It is noted that the shape of the present suspension arm 10 in the longitudinal direction and the cross-sectional shape of the present suspension arm 10 are not limited to those in the above-described embodiment. For example, the present suspension arm 10 may be shaped so as to extend in a straight line, be bent, or extend in an arc shape with respect to the longitudinal direction. The present suspension arm 10 may have an L-shape, a C-shape, or a T-shape as the cross-sectional shape, for example.

The present suspension arm 10 may be mounted in any orientation. For example, the present suspension arm 10 may be mounted pivotably about an axis extending generally in the front and rear direction of the vehicle, may be mounted pivotably about an axis extending generally in the up and down direction, and may be mounted pivotably about an axis inclined with respect to the widthwise direction, the front and rear direction, and the up and down direction. Even in the case where the present suspension arm 10 is mounted in any orientation, the present suspension arm 10 can suppress torsional deformation due to a force acting in a direction perpendicular to the line Lb of force transmission and reduce lowering of a buckling strength against a compressive force in the longitudinal direction.

Also in the case where the present suspension arm 10 is mounted not via the rubber bushings but via bearings and ball joints, the suspension arm 10 can suppress the torsional deformation and reduce lowering of the buckling strength. Also, the mount portion to be mounted on the wheel-side component may have a single through hole.

What is claimed is:

1. A suspension arm comprising:
an elongate-shaped suspension arm, the suspension arm being shaped such that a line defining an outer shape of the suspension arm does not coincide with a line of force transmission, and a line extending through a shearing center point of each of a plurality of cross-sections of the suspension arm each coincide with the line of force transmission.

2. The suspension arm according to claim 1, further comprising:
a pair of flanges each extending in a longitudinal direction of the suspension arm; and
a connector connecting the pair of flanges to each other, wherein:
the suspension arm is bent with respect to the longitudinal direction, and
the connector is offset towards one of opposite sides of a center point of the pair of flanges with respect to the center point of the pair of flanges in a widthwise direction of the pair of flanges, the one of the opposites sides being nearer to the line of force transmission than another one of the opposite sides.

3. The suspension arm according to claim 2, wherein:
the line defining the outer shape of the suspension arm is a line extending through the center point of the pair of flanges in the widthwise direction, and
the connector is offset towards any one of opposite sides of the pair of flanges in the widthwise direction, with respect to the line defining the outer shape.

4. The suspension arm according to claim 2, wherein:
the line defining the outer shape of the suspension arm is the line extending through the center point of the pair of flanges in the widthwise direction, and
the line extending through a shearing center point of each of a plurality of cross-sections of the suspension arm is located on any one of opposite sides of the line defining the outer shape.

5. The suspension arm according to claim 2, wherein:
the line defining the outer shape of the suspension arm is the line extending through the center point of the pair of flanges in the widthwise direction,
the line of force transmission and the line defining the outer shape intersect each other, and the line extending through the shearing center point of each of a plurality of cross-sections of the suspension arm and the line defining the outer shape intersect each other.

6. The suspension arm according to claim 2, wherein the suspension arm has a crank shape curved when viewed in the longitudinal direction.

7. The suspension arm according to claim 2, wherein the suspension arm has an S-shape curved when viewed in the longitudinal direction.

8. The suspension arm according to claim 2, wherein the suspension arm has an I-shape.

9. The suspension arm according to claim 2, wherein the suspension arm is shaped such that a distance between: (i) the line extending through centroids on a plurality of cross-sections of the suspension arm, and (ii) the line of force transmission, is less than a distance between (a) the line extending through a center point of the suspension arm in the widthwise direction of the suspension arm and (b) the line of form transmission.

* * * * *